US012489156B2

United States Patent
Cho et al.

(10) Patent No.: US 12,489,156 B2
(45) Date of Patent: Dec. 2, 2025

(54) BATTERY MODULE, BATTERY PACK COMPRISING BATTERY MODULE, AND VEHICLE COMPRISING BATTERY PACK

(71) Applicant: LG Energy Solution, Ltd., Seoul (KR)

(72) Inventors: Yong-Jin Cho, Daejeon (KR); Jun-Yeob Seong, Daejeon (KR); Jason Chong-Hoon Kwon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 789 days.

(21) Appl. No.: 17/762,521

(22) PCT Filed: Sep. 4, 2020

(86) PCT No.: PCT/KR2020/011985
§ 371 (c)(1),
(2) Date: Mar. 22, 2022

(87) PCT Pub. No.: WO2021/066337
PCT Pub. Date: Apr. 8, 2021

(65) Prior Publication Data
US 2022/0336881 A1     Oct. 20, 2022

(30) Foreign Application Priority Data

Oct. 4, 2019  (KR) .................. 10-2019-0123390

(51) Int. Cl.
*H01M 10/625* (2014.01)
*H01M 10/04* (2006.01)
(Continued)

(52) U.S. Cl.
CPC ....... *H01M 10/625* (2015.04); *H01M 10/049* (2013.01); *H01M 10/613* (2015.04);
(Continued)

(58) Field of Classification Search
CPC ............. H01M 10/625; H01M 10/049; H01M 10/613; H01M 10/653; H01M 10/654; H01M 10/6553; H01M 2220/20
See application file for complete search history.

(56) References Cited

U.S. PATENT DOCUMENTS 9,385,405 B2    7/2016   Murata et al.
11,349,173 B2 *  5/2022   Kwak .................. H01M 50/24
(Continued)

FOREIGN PATENT DOCUMENTS

CN    107768694 A  *  3/2018 ........ H01M 10/0404
CN    207134407 U     3/2018
(Continued)

OTHER PUBLICATIONS

Machine translation of CN 107768694A description (Xiang et. al.) (Year: 2024).*
(Continued)

*Primary Examiner* — Matthew T Martin
*Assistant Examiner* — Felicity B Alban
(74) *Attorney, Agent, or Firm* — Lerner David LLP

(57) ABSTRACT

Disclosed is a battery module, which includes a plurality of battery cells stacked on each other, a module case configured to accommodate the plurality of battery cells, a thermal resin filled in the module case to cover electrode leads of the plurality of battery cells at least partially, a laser sensor provided to the module case to measure a filling length of the thermal resin, and a control unit configured to control filling of the thermal resin based on the filling length information measured by the laser sensor.

8 Claims, 8 Drawing Sheets

(51) Int. Cl.
  *H01M 10/613* (2014.01)
  *H01M 10/653* (2014.01)
  *H01M 10/654* (2014.01)
  *H01M 10/6553* (2014.01)

(52) U.S. Cl.
  CPC ....... *H01M 10/653* (2015.04); *H01M 10/654* (2015.04); *H01M 10/6553* (2015.04); *H01M 2220/20* (2013.01)

(56) References Cited

U.S. PATENT DOCUMENTS

| | | | |
|---|---|---|---|
| 2007/0087266 A1 | 4/2007 | Bourke et al. | |
| 2013/0040177 A1 | 2/2013 | Hashio et al. | |
| 2016/0197386 A1 | 7/2016 | Moon et al. | |
| 2017/0373287 A1* | 12/2017 | Yamashita | H01M 50/367 |
| 2018/0076493 A1 | 3/2018 | Park et al. | |
| 2018/0287112 A1 | 10/2018 | Juventin et al. | |
| 2019/0044201 A1 | 2/2019 | Jo et al. | |
| 2019/0131678 A1 | 5/2019 | Kim et al. | |
| 2019/0198952 A1 | 6/2019 | Choi et al. | |
| 2020/0220128 A1 | 7/2020 | Kim et al. | |
| 2021/0328279 A1 | 10/2021 | Jeong et al. | |
| 2021/0328284 A1* | 10/2021 | Kim | H01M 10/625 |

FOREIGN PATENT DOCUMENTS

| | | | |
|---|---|---|---|
| JP | 2008251471 A | 10/2008 | |
| JP | 5173227 B2 | 4/2013 | |
| JP | 5723139 B2 | 5/2015 | |
| JP | 2015097176 A | 5/2015 | |
| JP | 2017111872 A | 6/2017 | |
| JP | 2018206533 A | 12/2018 | |
| JP | 2019501477 A | 1/2019 | |
| JP | 2019515461 A | 6/2019 | |
| KR | 101109288 B1 | 1/2012 | |
| KR | 20120081402 A | 7/2012 | |
| KR | 20150025236 A | 3/2015 | |
| KR | 20160105360 A | 9/2016 | |
| KR | 101847240 B1 | 4/2018 | |
| KR | 20180039453 A | 4/2018 | |
| KR | 20180064485 A | 6/2018 | |
| KR | 20180084540 A | 7/2018 | |
| KR | 20180088197 A | 8/2018 | |
| KR | 20190064835 A | 6/2019 | |
| KR | 20190069872 A | 6/2019 | |
| KR | 20190092835 A | 8/2019 | |
| WO | 2019107795 A1 | 6/2019 | |

OTHER PUBLICATIONS

Machine translation of JP 2018206533A description (Maeda et. al.) (Year: 2024).*
Machine translation of CN107768694A description.*
Extended European Search Report for Application No. 20871359.4 dated Jan. 25, 2023. 8 pgs.
International Search Report PCT/KR2020/011985 dated Dec. 21, 2020. 3 pgs.

* cited by examiner

BATTERY MODULE, BATTERY PACK COMPRISING BATTERY MODULE, AND VEHICLE COMPRISING BATTERY PACK

CROSS-REFERENCE TO RELATED APPLICATIONS TECHNICAL FIELD

The present application is a national stage entry under 35 U.S.C. § 371 of International Application No. PCT/KR2020/011985, filed on Sep. 4, 2020, published in Korean, which claims priority to Korean Patent Application No. 10-2019-0123390, filed on Oct. 4, 2019, the disclosures of which are incorporated herein by reference in their entireties.

TECHNICAL FIELD

The present disclosure relates to a battery module, a battery pack including the battery module, and a vehicle including the battery pack.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attention as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells is connected in series or in parallel to configure a battery pack, it is common to configure a battery module including at least one battery cell first, and then configure a battery pack by using at least one battery module and adding other components.

In the conventional battery module, it is important to solve the performance deterioration due to heat generated by charging and discharging. When the battery module is charged and discharged, the resistance is high at electrode leads of the battery cells, which is one of portions with the smallest unit area, so the heat is generated at the electrode leads greatest, which leads to damage to the battery cells.

Therefore, there is a demand to find a more effective method for controlling heat generation at the electrode leads of the battery cells in the battery module, when cooling the battery module.

DISCLOSURE

Technical Problem

The present disclosure is directed to providing a battery module, which may effectively suppress a temperature increase caused by heat generated at electrode leads of battery cells, a battery pack including the battery module, and a vehicle including the battery pack.

Technical Solution

In one aspect of the present disclosure, there is provided a battery module, comprising: a plurality of battery cells stacked on each other; a module case configured to accommodate the plurality of battery cells; a thermal resin filled in the module case to cover electrode leads of the plurality of battery cells at least partially; a laser sensor provided to the module case to measure a filling length of the thermal resin when the thermal resin is filled to cover the electrode leads at least partially; and a control unit electrically connected to the laser sensor to control filling of the thermal resin based on the filling length information measured by the laser sensor.

The battery module may have at least one resin injection hole formed at one side of the module case so that the thermal resin is injected therethrough from a resin injection device so as to be filled in the battery module, and the laser sensor may be provided at the other side of the module case.

The control unit may be electrically connected to the resin injection device and configured to stop injection of the thermal resin from the resin injection device when the filling length measured by the laser sensor is equal to or greater than a preset filling length.

The at least one resin injection hole may be provided at a location higher than the electrode leads of the plurality of battery cells, and the laser sensor may be provided at a location lower than the electrode leads of the plurality of battery cells.

The battery module may comprise a bus bar assembly electrically connected to the electrode leads of the plurality of battery cells and configured to cover both sides of the module case, and the control unit may be provided to the bus bar assembly.

The bus bar assembly may include a transparent window provided in a horizontal direction parallel to the electrode leads of the plurality of battery cells.

The transparent window may include a leveling gradation for checking a filling height of the thermal resin.

The battery module may have at least one filling confirmation hole formed at one side of the module case and disposed on the same line as the electrode leads of the plurality of battery cells.

In addition, the present disclosure further provides a battery pack, comprising: at least one battery module according to the above embodiments; and a pack case configured to package the at least one battery module.

Moreover, the present disclosure further provides a vehicle, comprising at least one battery pack according to the above embodiments.

Advantageous Effects

According to various embodiments as described above, it is possible to provide a battery module, which may effectively suppress a temperature increase caused by heat generated at electrode leads of battery cells, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
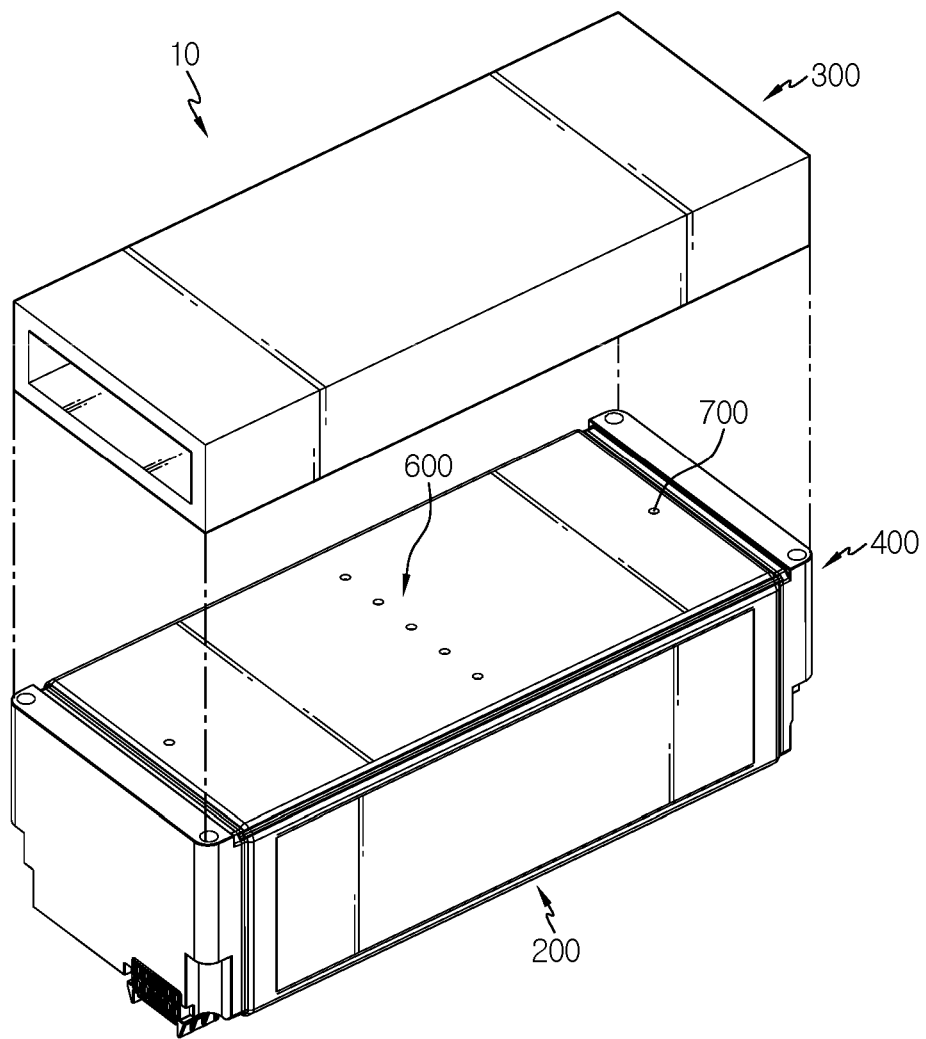
FIG. 1 is a diagram for illustrating a battery module according to an embodiment of the present disclosure.
Figure 2:
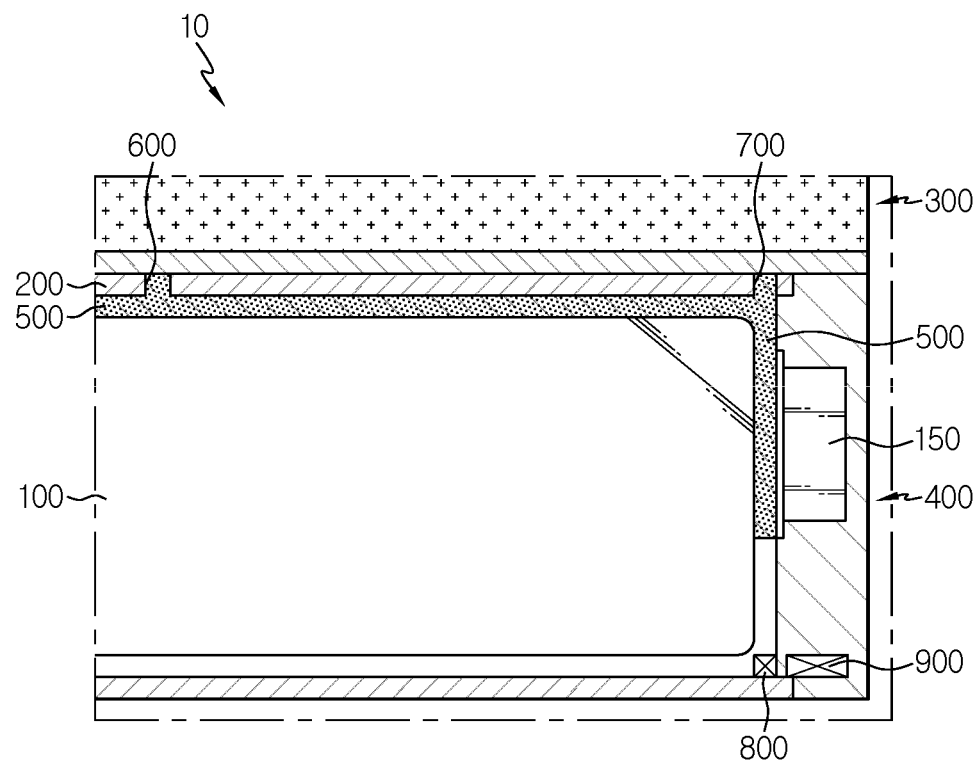
FIG. 2 is a sectional view showing a main part of the battery module of FIG. 1.
Figure 3:
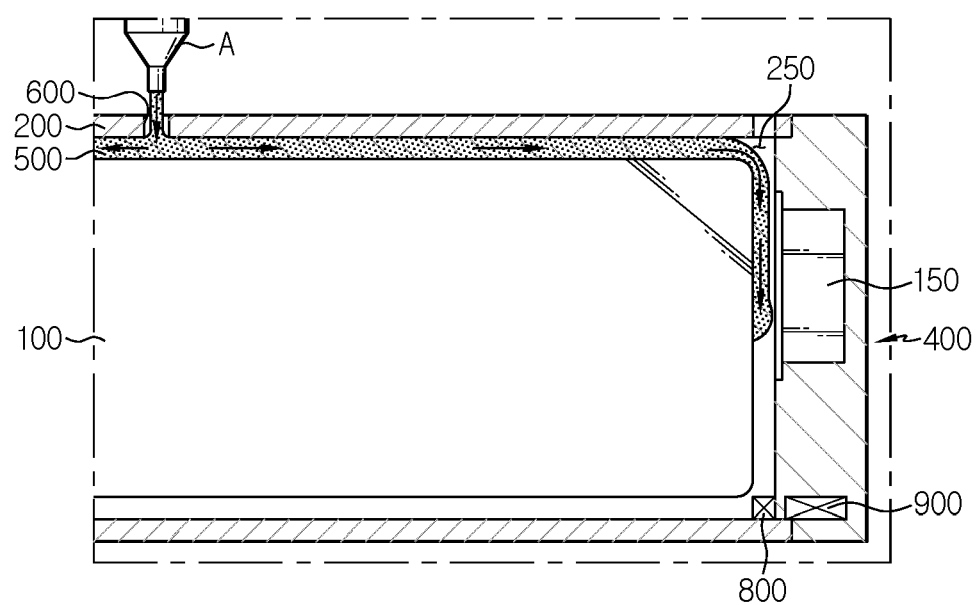
FIGS. 3 and 4 are diagrams for illustrating a process of injecting a thermal resin into the battery module of FIG. 1.
Figure 4:
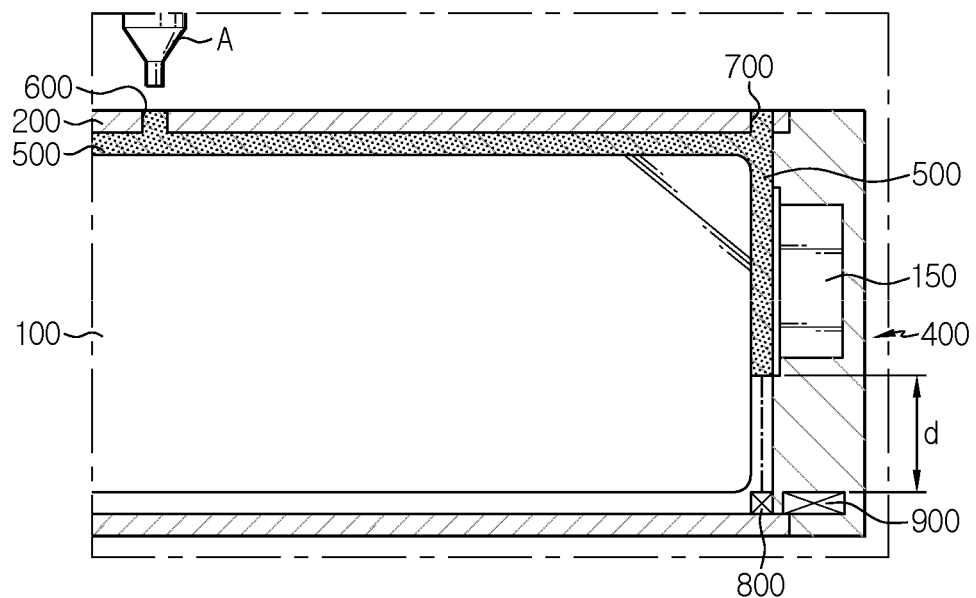

FIG. 1 is a diagram for illustrating a battery module according to an embodiment of the present disclosure, FIG. 2 is a sectional view showing a main part of the battery module of FIG. 1, and FIGS. 3 and 4 are diagrams for illustrating a process of injecting a thermal resin into the battery module of FIG. 1.

Referring to FIGS. 1 to 4, a battery module 10 may include a battery cell 100, a module case 200, a heatsink 300, a bus bar assembly 400, a thermal resin 500, a resin injection hole 600, a filling confirmation hole 700, a laser sensor 800 and a control unit 900.

The battery cell 100 is a secondary battery and may be provided as a pouch-type secondary battery, a rectangular secondary battery or a cylindrical secondary battery. Hereinafter, in this embodiment, it will be described that the battery cell 100 is a pouch-type secondary battery.

The battery cell 100 may be provided in plural. The plurality of battery cells 100 may be stacked to be electrically connected to each other. The electrical connection may be implemented by electrically connecting electrode leads 150 of the plurality of battery cells 100 and the bus bar assembly 400, explained later.

The module case 200 may accommodate the plurality of battery cells 100. To this end, an accommodation space for accommodating the plurality of battery cells 100 may be provided in the module case 200. In addition, components such as various electric components of the battery module 10 may be accommodated in the module case 200.

The heatsink 300 for cooling the battery cells 100 of the battery module 10 may be mounted to one side of the module case 200, specifically to an upper side of the module case 200.

The module case 200 may have a resin filling channel 250.

The resin filling channel 250 is provided in the module case 200 and may form a predetermined space for connecting the at least one resin injection hole 600, explained later, with the electrode leads 150 of the plurality of battery cells 100.

The heatsink 300 is for cooling the plurality of battery cells 100 and may be mounted to the upper side of the module case 200. The heatsink 300 may be disposed to face the thermal resin 500, explained later, with the module case 200 being interposed therebetween.

The heatsink 300 may be provided in an air-cooled or water-cooled structure. Hereinafter, in this embodiment, it will be described that the heatsink 300 is provided in a water-cooled structure through which a cooling water flows.

The bus bar assembly 400 may electrically connect the electrode leads 150 of the battery cells 100. The bus bar assembly 400 may cover both sides of the module case 200.

The thermal resin 500 is disposed inside the module case 200 to face the heatsink 300 and may be filled in the module case 200 to cover the electrode leads 150 of the plurality of battery cells 100 at least partially.

The thermal resin 500 may be made of a material with high thermal conductivity and insulating property. The thermal resin 500 may guide the cooling of the battery cells 500 and the stable fixation of the battery cells 500 inside the module case 200.

The resin injection hole 600 is formed at one side of the module case 200, specifically at the upper side of the module case 200, and may be provided as a hole of a predetermined size for filling the thermal resin 500.

The resin injection hole 600 may be provided in plural.

The plurality of resin injection holes 600 may be disposed at a center of one side of the module case 200, specifically at a center of the upper side of the module case 200, to be spaced apart from each other by a predetermined distance.

Here, the plurality of resin injection holes 600 may be provided at a location higher than the electrode leads 150 of the plurality of battery cells 100. Accordingly, when the thermal resin 500 is injected by means of a resin injection device A, the thermal resin 500 may be injected naturally toward the electrode leads 150 due to its own weight, thereby improving the injection efficiency.

The filling confirmation hole 700 may be formed at one side of the module case 200, specifically at the upper side of the module case 200, and may be provided at an upper edge of the module case 200 that is spaced apart from the plurality of resin injection holes 600.

The filling confirmation hole 700 may be disposed on the same line as the electrode leads 150 of the plurality of battery cells 100 in a height direction of the module case 200 so that it is easily checked whether the electrode leads 150 of the plurality of battery cells 100 is filled.

The filling confirmation hole 700 may be provided in a pair. The pair of filling confirmation holes 700 may be disposed to face each other with the plurality of resin injection holes 600 being interposed therebetween.

When the thermal resin 500 is injected through the filling confirmation hole 700, a manufacturer or the like may check whether the thermal resin 500 is properly filled toward the electrode leads 150 of the battery cells 100.

Specifically, while the thermal resin 500 is being continuously injected, the thermal resin 500 may be filled to partially cover the electrode leads 150 of the battery cells 100.

After that, if the thermal resin 500 is filled further, the thermal resin 500 may flow into the filling confirmation holes 700, which are disposed on the same line as the electrode leads 150 of the battery cells 100.

By checking that the thermal resin 500 flows into the filling confirmation holes 700, the manufacturer or the like may confirm that the thermal resin 500 is filled up to the electrode leads 150 of the battery cells 100 and also confirm that the thermal resin 500 is sufficiently filled inside the module case 200.

If the thermal resin 500 is filled so much to overflow out of the filling confirmation hole 700, the manufacturer or the like may stop the injection of the thermal resin 500 through the resin injection device A and complete the injection process of the thermal resin 500. After the injection process of the thermal resin 500 is completed, the heatsink 300 may be mounted at the upper side of the module case 200 where the filling confirmation hole 700 and the resin injection hole 600 are provided.

The laser sensor 800 may be provided to the module case 200 to measure a filling length of the thermal resin 500 when the thermal resin 500 is filled to cover the electrode leads 150 at least partially.

The laser sensor 800 may be provided at the other side of the module case 200. Specifically, the laser sensor 800 may be provided at a location lower than the electrode leads 150 of the plurality of battery cells 100 inside the module case 200. Moreover, the laser sensor 800 may be disposed to face the filling confirmation hole 700 with the electrode leads 150 being interposed therebetween.

The control unit 900 is electrically connected to the laser sensor 700 and may control filling of the thermal resin 500 based on the filling length information measured by the laser sensor 700.

The control unit 900 may be provided to the bus bar assembly 400 and may be connected to the laser sensor 800 by wire or wirelessly for electrical connection with the laser sensor 800. In addition, the control unit 900 may be electrically connected to the resin injection device A by wire or wirelessly to control the filling of the thermal resin 500.

Specifically, the control unit 900 may stop the injection of the thermal resin 500 from the resin injection device A when the filling length (d) measured by the laser sensor 800 is greater than or equal to a preset filling length. The preset filling length may be a length including the total length from the top to the bottom of the electrode lead 150 in a height direction of the module case 200.

As described above, in this embodiment, it is possible to control the thermal resin 500 to be properly injected even through the control unit 900 and the laser sensor 800. In this embodiment, by means of the injection control through the laser sensor 800 and the control unit 900, it is possible to fundamentally block the risk of poor filling of the thermal resin 500 even though an unexpected situation occurs since the manufacturer or the like incorrectly checks the thermal resin 500 through the filling confirmation hole 700 or fails to visually check the thermal resin 500.

Figure 5:
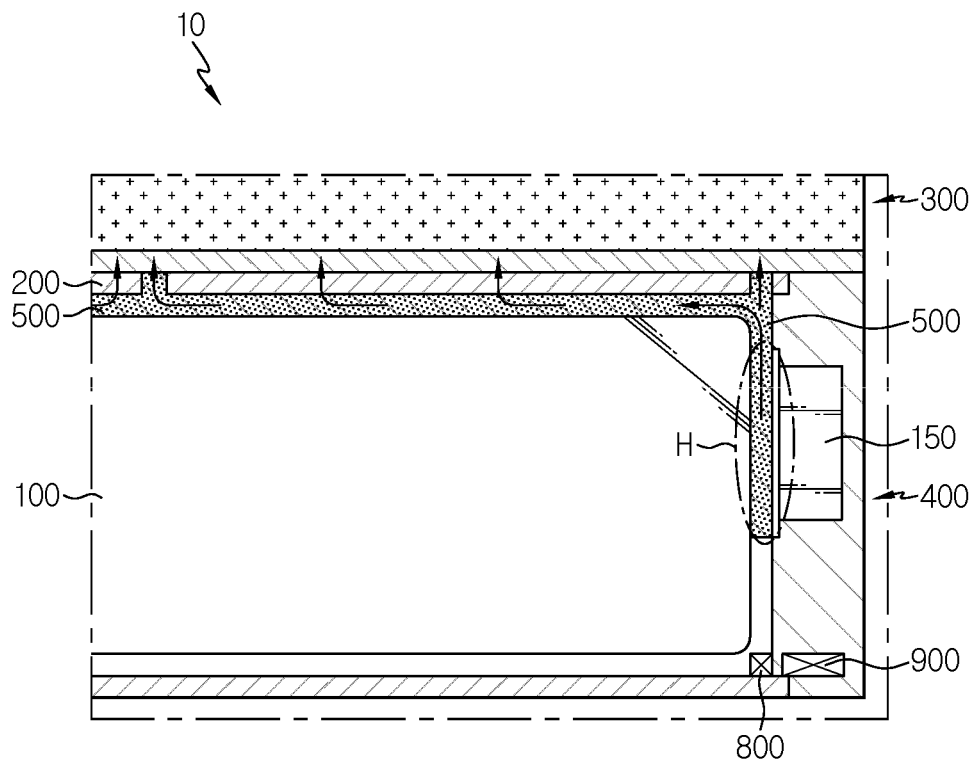
FIG. 5 is a diagram for illustrating a cooling mechanism of the battery module of FIG. 1.

FIG. 5 is a diagram for illustrating a cooling mechanism of the battery module of FIG. 1.

Referring to FIG. 5, when the battery module 10 generates heat, the highest heat generation H may occur at the electrode leads 150 of the battery cells 100. This is because the cross-sectional area of the electrode leads 150 of the battery cells 100 is relatively smaller than the cross-sectional area of other components of the battery module 10 and thus the resistance is highest at the electrode leads 150 of the battery cells 100 in terms of the current flow according to charging and discharging.

In this embodiment, since the thermal resin 500 is filled in the heating portion H of the electrode leads 150 of the battery cells 100, the heat of the heating portion H of the electrode leads 150 may be effectively transferred toward the heatsink 300.

Specifically, since the heat of the heating portion H of the electrode leads 150 is transferred to the upper side of the module case 200 through the thermal resin 500 and then immediately transferred to the heatsink 300 disposed at the upper side of the module case 200, a temperature rise caused by the heat of the electrode leads 150, where the highest heat is generated inside the module case 200 of the battery module 10, may be effectively suppressed.

As described above, in this embodiment, the damage caused by the temperature rise of the battery cells 100 may be minimized by means of the thermal resin 500 that covers the electrode leads 150 of the battery cells 100 at least partially, it is possible to extend the life span of the battery cells 100 and effectively prevent performance deterioration caused by the heat generated at the battery cells 100.

Moreover, in this embodiment, since the electrode leads 150 of the battery cells 100 are covered by the injected and filled thermal resin 500, the assembly process may become simpler, compared to the structure where a thermal conduction member or the like, such as a completed accessory for cooling the electrode leads 150, is added separately inside the module case 200.

Specifically, if a thermal conduction member or the like having a predetermined shape is added separately in advance to cool the electrode leads 150, interference with may occur with the battery cells 100 or other electrical components inside the module case 200 during the assembly process, which may increase the risk of damage to these components or the battery cells 100 and also may increase the possibility of erroneous assembly caused by assembly tolerances when the separate thermal conduction member is assembled inside the module case.

However, in this embodiment, since the electrode leads 150 of the battery cells 100 are covered by filling the thermal resin 500, unlike the case where a separate thermal conduction member is additionally assembled, there is no risk of damage to the battery cells 100 or other electric parts inside the module case 100, and erroneous assembly problems caused by assembly tolerances may be fundamentally prevented.

Figure 6:
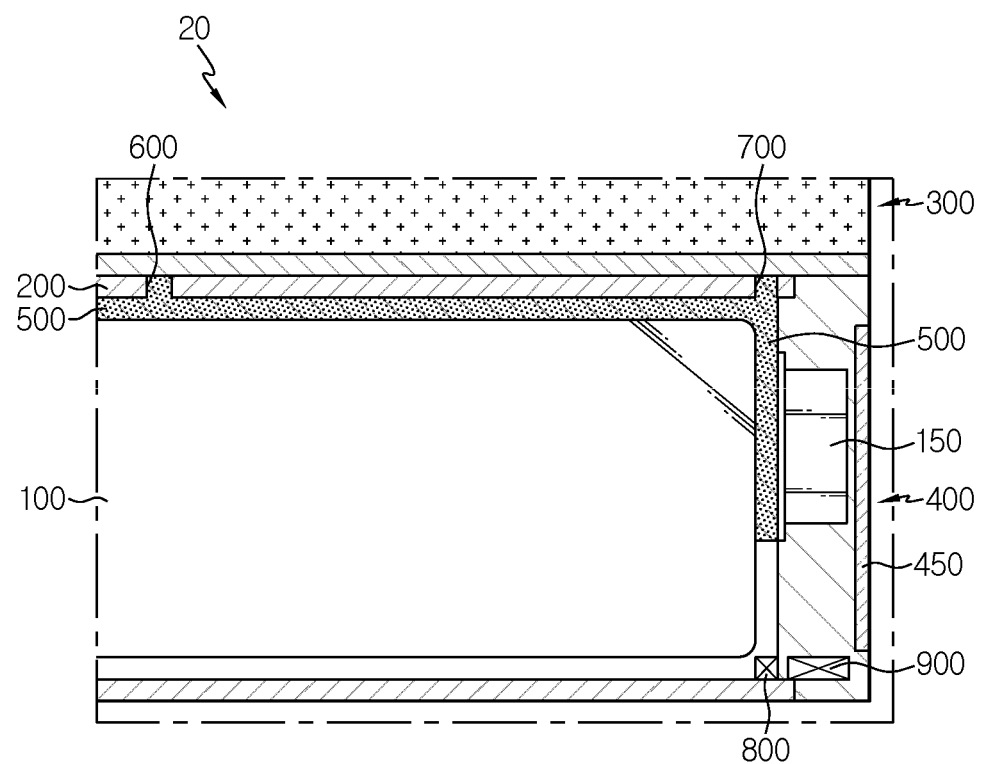
FIGS. 6 to 8 are diagrams for illustrating a battery module according to another embodiment of the present disclosure.
Figure 7:
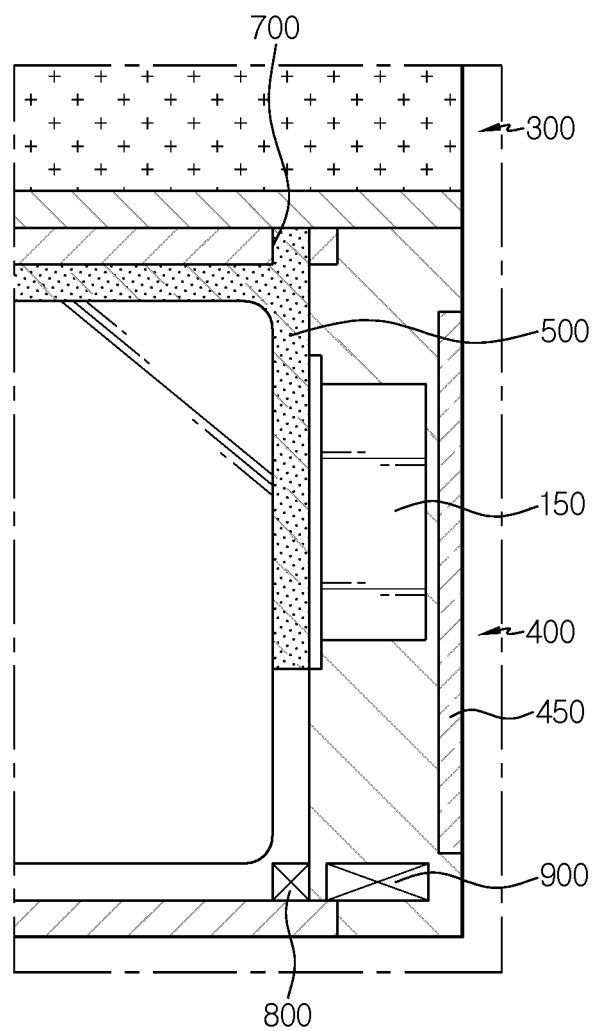
Figure 8:
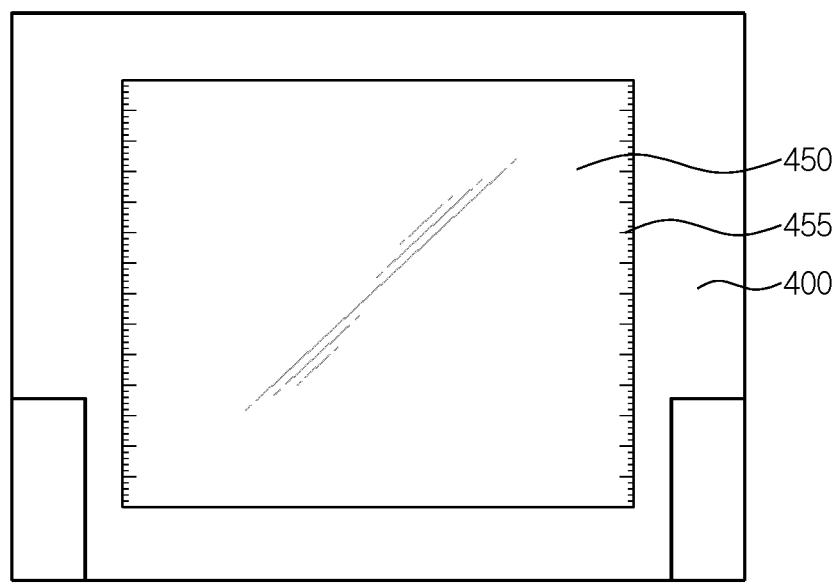

FIGS. 6 to 8 are diagrams for illustrating a battery module according to another embodiment of the present disclosure.

The battery module 20 according to this embodiment is similar to the battery module 10 of the former embodiment. Thus, features substantially identical or similar to the former embodiment will not be described again, and hereinafter, features different from the former embodiment will be described in detail.

Referring to FIGS. 6 to 8, the battery module 20 may include a battery cell 100, a module case 200, a heatsink 300, a bus bar assembly 400, a thermal resin 500, a resin injection hole 600, a filling confirmation hole 700, a laser sensor 800 and a control unit 900.

The battery cell 100, the module case 200, the heatsink 300, the thermal resin 500, the resin injection hole 600, the filling confirmation hole 700, the laser sensor 800 and the control unit 900 are substantially identical or similar to the former embodiment and thus, hereinafter, will not be described again.

The bus bar assembly 400 may include a transparent window 450.

The transparent window 450 is provided in a horizontal direction parallel to the electrode leads 150 of the plurality of battery cells 100 and may be provided such that the thermal resin 500 filled toward the electrode leads 150 is visually checked from the outside at both sides of the battery module 10.

The transparent window 450 may have a leveling gradation 455. The leveling gradation 455 may be formed along a height direction of the transparent window 450 so that the filling height of the thermal resin 500 may be confirmed.

As described above, the battery module 20 according to this embodiment may guide the degree of filling of the thermal resin 500 to the electrode leads 150 to be more easily confirmed at the outside of both sides of the battery module 10 through the transparent window 450 having the leveling gradation 455. That is, since the manufacturer or the like may visually check the degree of filling of the thermal resin 500 in the horizontal direction of the electrode leads 150, the accuracy of the visual confirmation of the manufacturer or the like may be remarkably improved.

Figure 9:
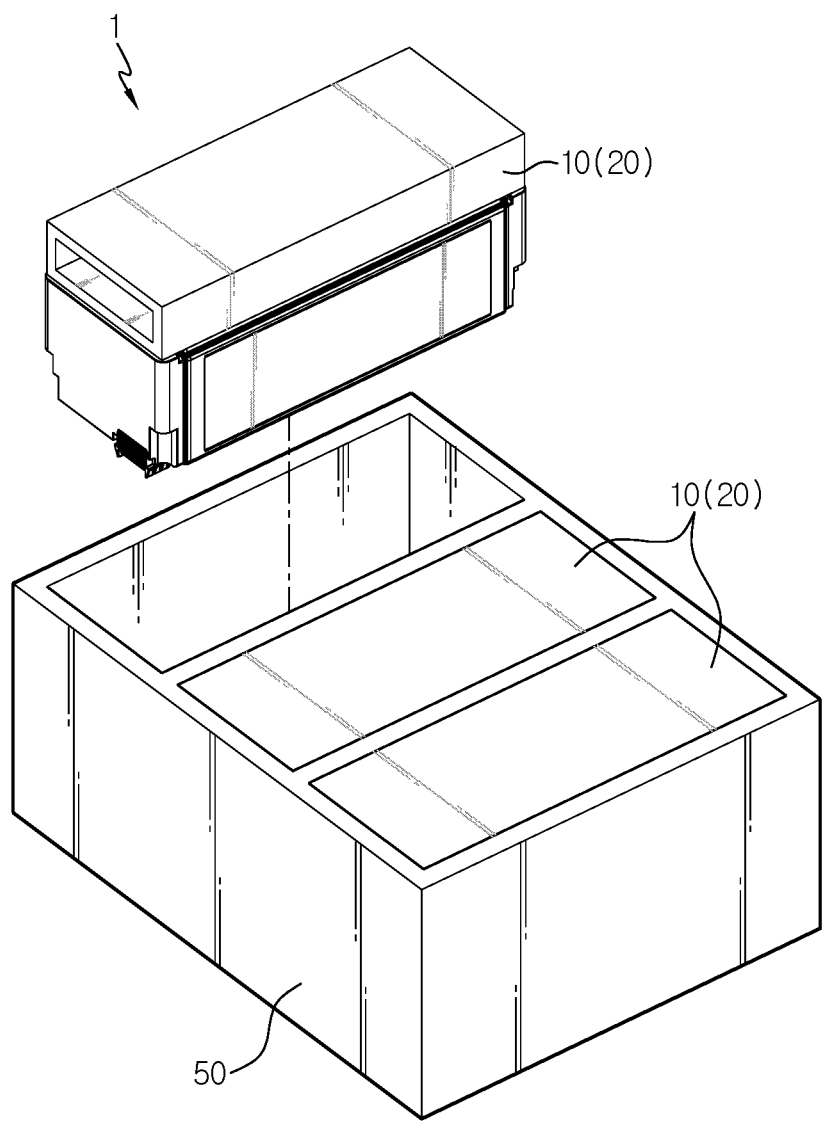
FIG. 9 is a diagram for illustrating a battery pack according to an embodiment of the present disclosure.
Figure 10:
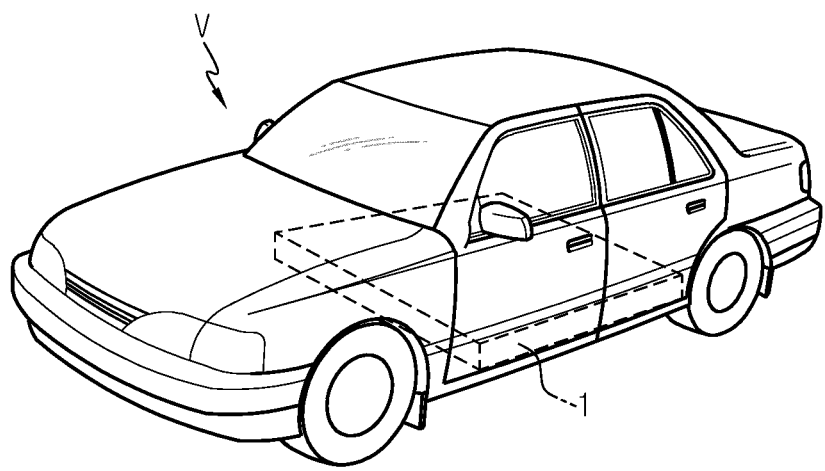
FIG. 10 is a diagram for illustrating a vehicle according to an embodiment of the present disclosure.

FIG. 9 is a diagram for illustrating a battery pack according to an embodiment of the present disclosure, and FIG. 10 is a diagram for illustrating a vehicle according to an embodiment of the present disclosure.

Referring to FIGS. 9 and 10, a battery pack 1 may include at least one battery module 10, 20 and a pack case 50 for packaging the at least one battery module 10 according to the former embodiment.

The at least one battery module 10, 20 may be configured to include as at least one battery module or a plurality of battery modules of the former embodiment. If the battery module 10, 20 is provided in plural, it is also possible that the battery module 10 and the battery module 20 of the former embodiments are provided in a group.

The battery pack 1 may be provided to a vehicle V as a fuel source of the vehicle V. As an example, the battery pack 1 may be provided to an electric vehicle, a hybrid electric vehicle, and various other-type vehicles V capable of using the battery pack 1 as a fuel source.

In addition, the battery pack 1 may be provided in other devices, instruments or facilities such as an energy storage system using a secondary battery, in addition to the vehicle V.

As described above, the battery pack 1 of this embodiment and devices, instruments or facilities such as the vehicle V, which have the battery pack 1, include the battery module 10, 20 as described above, and thus it is possible to implement a battery pack 1 having all the advantages of the battery module 10, 20 described above, or devices, instruments, facilities or the like such as the vehicle V, which have the battery pack 1.

According to various embodiments as described above, it is possible to provide the battery module 10, 20, which may effectively suppress a temperature increase caused by heat generated at the electrode leads 150 of the battery cells 100, the battery pack 1 including the battery module 10, 20, and the vehicle V including the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
   a plurality of battery cells stacked on each other;
   a module case accommodating the plurality of battery cells therein;
   a thermal resin filled in the module case at least partially covering electrode leads of the plurality of battery cells;
   a laser sensor inside the module case configured to measure a filling length of the thermal resin within the module case; and
   a control unit electrically connected to the laser sensor, the control unit configured to control filling of the thermal resin based on the filling length measured by the laser sensor,
   wherein the battery module has at least one resin injection hole formed in a first side of the module case, the at least one resin injection hole configured to receive injection therethrough of the thermal resin from a resin injection device so as to be filled within the module case, and the laser sensor is provided at a second side of the module case opposite from the first side, and
   wherein the battery module comprises a bus bar assembly electrically connected to the electrode leads of the plurality of battery cells and covering opposite sides of the module case, and the control unit is disposed within the bus bar assembly.

2. The battery module according to claim 1, wherein the control unit is electrically connected to the resin injection device and is configured to stop injection of the thermal resin from the resin injection device when the filling length measured by the laser sensor is equal to or greater than a preset filling length.

3. The battery module according to claim 1, wherein the at least one resin injection hole is provided at a location higher than a location of the electrode leads of the plurality of battery cells, and the laser sensor is provided at a location lower than the location of the electrode leads of the plurality of battery cells.

4. The battery module according to claim 1, wherein the bus bar assembly includes a transparent window extending in a horizontal direction parallel to the electrode leads of the plurality of battery cells.

5. The battery module according to claim 4, wherein the transparent window includes a leveling gradation for checking the filling length of the thermal resin.

6. The battery module according to claim 1, wherein the battery module has at least one filling confirmation hole formed within a first side of the module case and disposed along a same linear resin filling path as the electrode leads of the plurality of battery cells.

7. A battery pack, comprising:
   at least one battery module, each battery module as defined in claim 1; and
   a pack case configured to package the at least one battery module.

8. A vehicle, comprising:
   at least one battery pack, each battery pack as defined in claim 7.

\* \* \* \* \*